McCANN DUNN.
Oven.
No. 101,357.
Patented March 29, 1870.
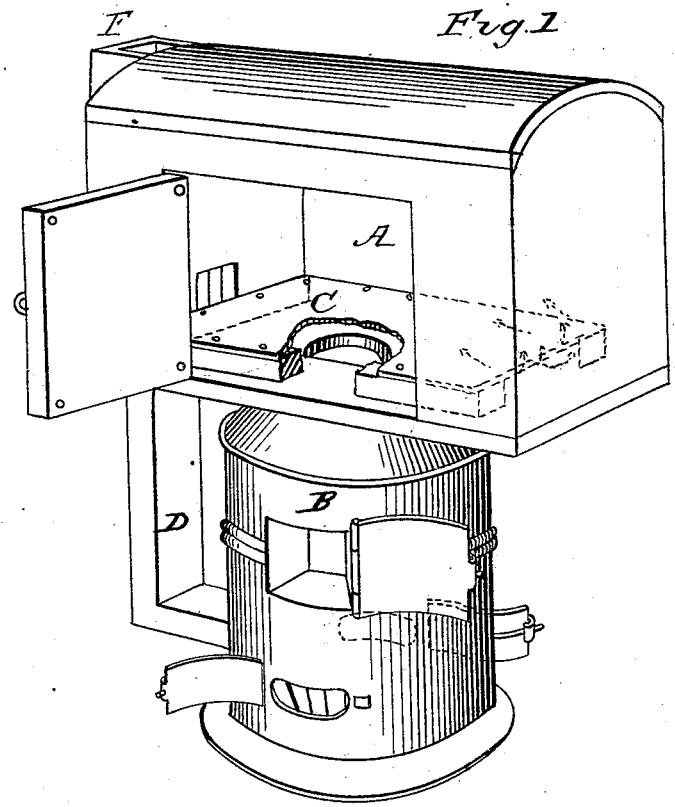
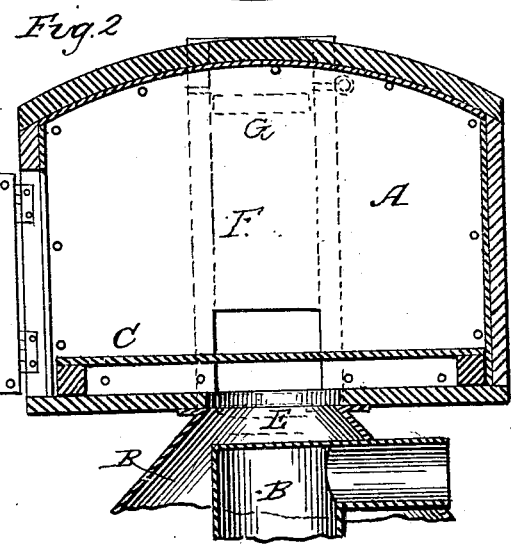

United States Patent Office.

McCANN DUNN, OF BLOOMINGTON, ILLINOIS.

Letters Patent No. 101,357, dated March 29, 1870; antedated March 19, 1870.

OVEN.

The Schedule referred to in these Letters Patent and making part of the same.

To all whom it may concern:

Be it known that I, McCANN DUNN, of Bloomington, in the county of McLean and in the State of Illinois, have invented certain new and useful Improvements in Ventilated Ovens; and do hereby declare that the following is a full, clear, and exact description thereof, reference being had to the accompanying drawings and to the letters of reference marked thereon making a part of this specification.

The nature of my invention consists in the construction and general arrangement of a "hot-air ventilated oven," whereby is obtained a perpetual circulation of hot air through the oven, and around and about the food placed therein.

In order to enable others skilled in the art to which my invention appertains to make and use the same, I will now proceed to describe its construction and operation, referring to the annexed drawings, in which—

Figure 1 is a perspective view, and
Figure 2 is a vertical section.

A represents the oven, made of any shape and size desired, of wood, metal, brick and mortar, or other material, such as have the least power to absorb or conduct heat being the best.

The oven A is lined with tin, or other bright or polished material, upon the entire interior surface, for the double purpose of preventing the conduction of heat from the oven, and of increasing, by reflection, the heat in the oven.

Heat is to be generated by the combustion of wood, coal, or other combustible material, in any convenient or proper-sized hot-air furnace, B, the heated air being admitted at the bottom, or at the top, or at any intermediate point, as may be desired for convenience in construction, and made to pass through the whole interior of the oven, heating a radiator at the bottom and one at the top, then passing out of the oven near or at the bottom and returning to the hot-air furnace to be again heated by return flue, or may be allowed to escape by ventilator, by a proper adjustment of dampers.

In the drawings I have represented the hot air as entering the oven at the bottom, under the radiator C, which should be made of iron or other suitable metal having the power of absorbing and radiating heat, and be of any convenient and proper thickness.

A similar radiator may be placed in the top of the oven.

The radiator C in the bottom of the oven is so constructed that the heat will escape into the oven only at one end, then pass through the entire oven, and out at or near the bottom of the opposite side.

At this side is a flue, D, which leads back into the hot-air furnace B, and, consequently, carries the air back again to the furnace to be heated anew.

The return flue D is provided with a damper, E, shown in dotted lines in fig. 2, so that, when it is not desired to re-heat the air, the flue may be closed and the air pass out through the ventilator F.

This ventilator is also provided with a damper, G, to prevent the egress of the air when desired to re-heat the same.

The novelties of this oven are the heating by convection or the circulation of hot air within the oven while baking, and the perfect ventilation of the oven at any or all times while baking.

Its utilities are, it avoids all possibility of burning any article of cooking; bread, meats, and the most delicate pastry can be cooked at the same time without detriment to each other or injury from excessive heat; it lessens the expense in the matter of fuel; and it can be constructed at less cost than any other oven of equal capacity.

Having thus fully described my invention,
What I claim as new, and desire to secure by Letters Patent, is—

1. The arrangement of a hot-air ventilated oven in such a manner that the air is circulated within the oven, and around and about the food placed therein, substantially as herein set forth.

2. The combination and arrangement of the oven A, hot-air furnace B, radiator C, flue D, ventilator F, and dampers E G, all constructed as described, and operating substantially in the manner and for the purposes herein set forth.

In testimony that I claim the foregoing I have hereunto set my hand this 3d day of September, 1869.

McCANN DUNN.

Witnesses:
    THOS. SLADE,
    W. M. HATCH.